(Model.)
H. P. BUFFON.
COFFEE ROASTER.
No. 266,428. Patented Oct. 24, 1882.
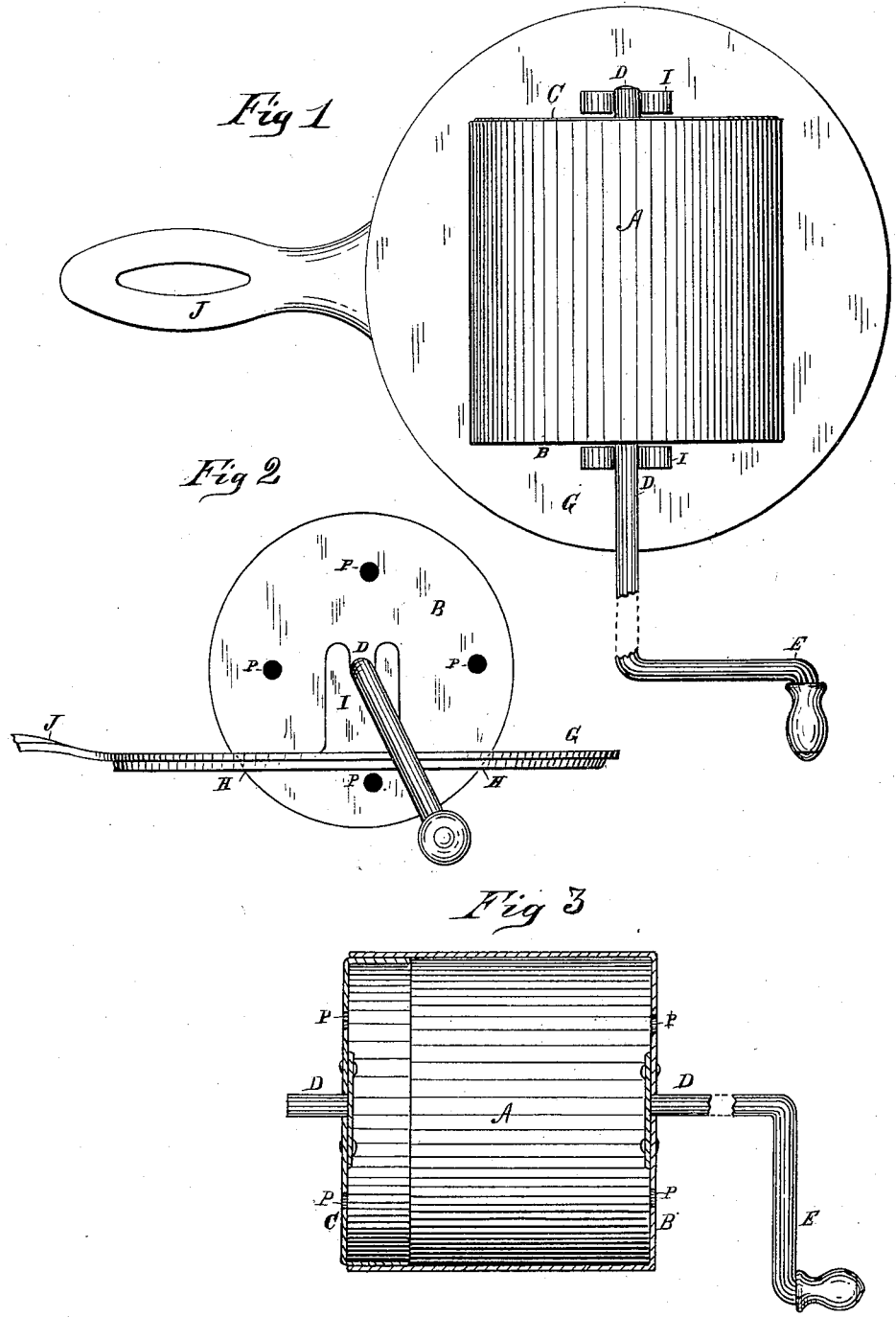
WITNESSES:
J. D. Garfield
C. Sedgwick
INVENTOR:
H. P. Buffon
BY Munn & Co
ATTORNEYS.

UNITED STATES PATENT OFFICE.

HUGH P. BUFFON, OF FORT D. A. RUSSELL, WYOMING TERRITORY.

COFFEE-ROASTER.

SPECIFICATION forming part of Letters Patent No. 266,428, dated October 24, 1882.

Application filed March 24, 1882. (Model.)

*To all whom it may concern:*

Be it known that I, HUGH PATRICK BUFFON, of Fort D. A. Russell, in the county of Laramie and Territory of Wyoming, have invented a new and Improved Coffee-Roaster, of which the following is a full, clear, and exact description.

This invention is intended to form a convenient and portable apparatus for use in roasting coffee, popping corn, or heating or cooking other substances.

Reference is to be had to the accompanying drawings, forming part of this specification, in which similar letters of reference indicate corresponding parts in all the figures.

Figure 1 is a plan view of my improved coffee-roaster. Fig. 2 is a side elevation, and Fig. 3 is a longitudinal section through the cylinder.

The drawings represent a preferred form of the improvement, in which A represents the roaster, which is formed of one long and one short tube, having respectively the heads B C. The short cylinder slides within the larger, and has a short journal, D, which serves both as a pivot and a handle for manipulating the head C, so as to open or close the long cylinder. Each of the heads B C is provided with holes P for the escape of the vaporized moisture from the coffee, so that the berry may roast brown and dry and without toughness or a dark hue.

G represents the stove-cover to be used in combination with the cylinder, said cover having an opening, H, through it for the cylinder, also having upright bearings I for the pivots of the cylinder, and also a handle, J, by which to use it. The size and shape of the hole H and the height of the bearing-standards and the cylinder are so relatively arranged that when the cylinder rests in the bearings it fits closely in and closes the hole in the cover to prevent the escape of smoke from the fire. The cover G is merely a plain flat cover of ordinary form, without other extension from its upper surface than the pivot-bearings, therefore being simple and inexpensive. The cylinder is also of the most simple form and construction. At the same time the two devices comprise all the requirements for a practically successful family coffee-roaster, and it is alike useful for a corn-popper.

By the holes P, provided in the ends of the cylinder, the coffee can be readily seen, as it lies against the heads around the hole, to watch the roasting, and the escaping vapor therefrom carries off much of the chaff and dust produced by the heat and friction of the grains, thus enabling the coffee to be turned out clean and well cooked.

The handle J and bearings I upon the apertured stove cover or lid are not essential elements of the simplest form of my invention, it being evident that handle J may be dispensed with, and the ordinary lifting-hole be provided in the cover for moving it with a separate lifter, it being also evident that the bearings I may be dispensed with, as the close fit of the cylinder A in the aperture H would constitute bearings upon which the cylinder may be revolved; but the construction shown is preferred, in that it promotes convenience in handling the apparatus, and insures its practically frictionless operation.

I am aware that coffee-roasters have been provided with handles and adapted to sit on a stove; also that a stove-plate has been provided with a hole and bearings for receiving a coffee-roaster; but

What I claim as new is—

The roaster A, consisting of a long and a short cylinder, the latter sliding within the former, and provided respectively with the heads B C, having central journals, of which the one D serves both as a pivot and a handle for the head C, as shown and described.

HUGH P. BUFFON.

Witnesses:
JAMES A. BEAN,
JNO. K. JEFFREY.